United States Patent
Rothenhaeusler et al.

(10) Patent No.: US 9,040,915 B2
(45) Date of Patent: May 26, 2015

(54) OPTICAL MODULE FOR SIMULTANEOUSLY FOCUSING ON TWO FIELDS OF VIEW

(75) Inventors: Konrad Rothenhaeusler, Achberg (DE); Gerhard Mueller, Bad Waldsee (DE); Lutz Kuehnke, Kronberg im Taunus (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 812 days.

(21) Appl. No.: 13/382,405

(22) PCT Filed: Jun. 22, 2010

(86) PCT No.: PCT/DE2010/000704
§ 371 (c)(1),
(2), (4) Date: Mar. 8, 2012

(87) PCT Pub. No.: WO2011/003381
PCT Pub. Date: Jan. 13, 2011

(65) Prior Publication Data
US 2012/0153154 A1 Jun. 21, 2012

(30) Foreign Application Priority Data

Jul. 6, 2009 (DE) .......................... 10 2009 031 968
Nov. 9, 2009 (DE) .......................... 10 2009 052 290
Apr. 29, 2010 (DE) .......................... 10 2010 018 796

(51) Int. Cl.
*G01J 1/44* (2006.01)
*G01J 5/20* (2006.01)
(Continued)

(52) U.S. Cl.
CPC ............ *H04N 5/2254* (2013.01); *B60S 1/0844* (2013.01)

(58) Field of Classification Search
CPC ................. G01J 1/44; G01J 5/20; G01J 1/06
USPC ....................... 250/338.4, 237 R, 216, 222.2
See application file for complete search history.

(56) References Cited

U.S. PATENT DOCUMENTS

| 4,515,443 A | 5/1985 | Bly |
| 4,741,605 A | 5/1988 | Alfredsson et al. |

(Continued)

FOREIGN PATENT DOCUMENTS

| CN | 1491840 A | 4/2004 |
| CN | 100490065 C | 5/2009 |

(Continued)

OTHER PUBLICATIONS

Notice of Allowance in U.S. Appl. No. 13/140,957, mailed Jun. 14, 2013, 5 pages.

(Continued)

*Primary Examiner* — David Porta
*Assistant Examiner* — Faye Boosalis
(74) *Attorney, Agent, or Firm* — W. F. Fasse

(57) ABSTRACT

The invention relates to an optical module, comprising a semiconductor element having a surface that is sensitive to electromagnetic radiation and an objective for projecting electromagnetic radiation onto the sensitive surface of the semiconductor element (image sensor or camera chip, in particular CCD or CMOS). The objective preferably comprises at least one lens and one lens retainer.
In the optical module, an optical element having two sub-areas is arranged either in the space between the objective and the sensitive surface of the semiconductor element or between individual lenses of the objective in the entire cross-section of the beam path. All electromagnetic radiation that reaches the sensitive surface of the semiconductor element passes through the optical element.
A first distance range (e.g. near range) is imaged in a first area of the sensitive surface of the semiconductor element in a focused manner by a first sub-area of the optical element, and a second distance range (e.g. far range) is imaged in a second area of the sensitive surface of the semiconductor element by a second sub-area.

18 Claims, 9 Drawing Sheets

Figure 1:
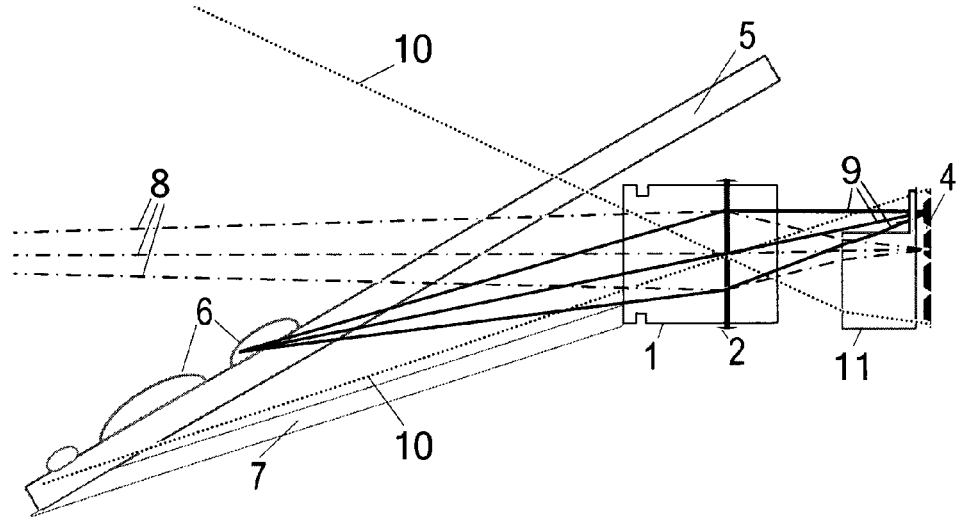

(51) Int. Cl.
  *G01J 1/06* (2006.01)
  *H04N 5/225* (2006.01)
  *B60S 1/08* (2006.01)

(56) References Cited

U.S. PATENT DOCUMENTS

| | | | |
|---|---|---|---|
| 5,987,152 | A | 11/1999 | Weisser |
| 6,331,819 | B1 | 12/2001 | Hog |
| 6,376,824 | B1 | 4/2002 | Michenfelder et al. |
| 6,392,218 | B1 | 5/2002 | Kuehnle |
| 6,452,148 | B1 | 9/2002 | Bendicks et al. |
| 6,555,804 | B1 | 4/2003 | Blasing |
| 6,614,015 | B1 | 9/2003 | Ba et al. |
| 6,617,564 | B2 * | 9/2003 | Ockerse et al. ............ 250/208.1 |
| 6,841,767 | B2 | 1/2005 | Mindl et al. |
| 7,208,962 | B2 | 4/2007 | Sun et al. |
| 7,259,367 | B2 | 8/2007 | Reime |
| 7,612,356 | B2 | 11/2009 | Utida et al. |
| 7,855,353 | B2 | 12/2010 | Blaesing et al. |
| 7,863,568 | B2 | 1/2011 | Fleury |
| 8,274,562 | B2 | 9/2012 | Walter et al. |
| 8,541,732 | B2 | 9/2013 | Rothenhaeusler |
| 8,913,132 | B2 | 12/2014 | Seger et al. |
| 2003/0066955 | A1 | 4/2003 | Schaub et al. |
| 2003/0201380 | A1 | 10/2003 | Ockerse et al. |
| 2004/0004456 | A1 | 1/2004 | LeBa et al. |
| 2004/0164981 | A1 | 8/2004 | Fujita et al. |
| 2005/0035926 | A1 | 2/2005 | Takenaga et al. |
| 2005/0063071 | A1 | 3/2005 | Wang et al. |
| 2005/0231725 | A1 | 10/2005 | Franz |
| 2006/0163458 | A1 | 7/2006 | Reime |
| 2006/0191215 | A1 | 8/2006 | Stark |
| 2007/0075220 | A1 | 4/2007 | Kotani |
| 2007/0216768 | A1 | 9/2007 | Smith et al. |
| 2007/0268470 | A1 | 11/2007 | Shibazaki |
| 2008/0027607 | A1 | 1/2008 | Ertl et al. |
| 2008/0185603 | A1 | 8/2008 | Itoi et al. |
| 2008/0265134 | A1 | 10/2008 | Kinoshita |
| 2008/0296577 | A1 | 12/2008 | Yuan et al. |
| 2009/0085755 | A1 | 4/2009 | Schafer et al. |
| 2009/0128629 | A1 | 5/2009 | Egbert et al. |
| 2009/0201366 | A1 | 8/2009 | Sase et al. |
| 2010/0208060 | A1 | 8/2010 | Kobayashi et al. |
| 2011/0043624 | A1 | 2/2011 | Haug |
| 2011/0253917 | A1 | 10/2011 | Rothenhaeusler |
| 2011/0273564 | A1 | 11/2011 | Seger et al. |
| 2012/0026318 | A1 | 2/2012 | Huelsen et al. |
| 2012/0026330 | A1 | 2/2012 | Huelsen et al. |
| 2013/0235381 | A1 | 9/2013 | Kroekel et al. |

FOREIGN PATENT DOCUMENTS

| | | |
|---|---|---|
| DE | 195 04 606 | 8/1996 |
| DE | 197 04 818 | 8/1997 |
| DE | 202 07 170 | 8/2002 |
| DE | 102 30 200 | 1/2004 |
| DE | 197 00 665 | 7/2004 |
| DE | 103 03 046 | 10/2004 |
| DE | 103 16 794 | 11/2004 |
| DE | 103 22 010 | 12/2004 |
| DE | 103 55 205 | 7/2005 |
| DE | 102004015040 | 10/2005 |
| DE | 102004037871 | 3/2006 |
| DE | 102005004513 | 3/2006 |
| DE | 102006008274 | 8/2007 |
| DE | 102006022404 | 11/2007 |
| DE | 102007061725 | 6/2009 |
| DE | 102008043737 | 5/2010 |
| EP | 0 832 798 | 4/1998 |
| EP | 1 580 092 | 9/2005 |
| EP | 1 764 835 | 3/2007 |
| EP | 1 923 280 | 5/2008 |
| EP | 1 923 695 | 5/2008 |
| EP | 2 062 777 | 5/2009 |
| JP | S57-004133 A | 1/1982 |
| JP | S60-125260 U | 8/1985 |
| JP | H04-061379 A | 2/1992 |
| JP | H11-234474 A | 8/1999 |
| JP | 2003-315256 A | 11/2003 |
| JP | 2004-296453 A | 10/2004 |
| JP | 2005-195569 A | 7/2005 |
| JP | 2005-292544 | 10/2005 |
| JP | 2005-292544 A | 10/2005 |
| JP | 2006-184844 | 7/2006 |
| JP | 2006-184844 A | 7/2006 |
| JP | 2008-219854 A | 9/2008 |
| JP | 2009-092453 A | 4/2009 |
| JP | 2009-098477 A | 5/2009 |
| JP | 2010-096604 A | 4/2010 |
| WO | WO 99/15381 | 4/1999 |
| WO | WO 03/029757 | 4/2003 |
| WO | WO 2005/075248 | 8/2005 |
| WO | WO 2006/015905 | 2/2006 |
| WO | WO 2006/121954 | 11/2006 |
| WO | WO 2008/069220 | 6/2008 |
| WO | WO 2009/020918 | 2/2009 |
| WO | WO 2010/072198 | 7/2010 |
| WO | WO 2012/163341 | 12/2012 |

OTHER PUBLICATIONS

Office Action in Chinese Patent Application No. 201080030415.3, mailed Dec. 4, 2013, 11 pages, with English translation, 11 pages.
International Search Report of the International Searching Authority for International Application PCT/DE2010/000704, mailed Dec. 6, 2010, 3 pages, European Patent Office, HV Rijswijk, Netherlands.
English Translation of PCT International Preliminary Report on Patentability of the International Searching Authority for International Application PCT/DE2010/000704, mailed Jan. 12, 2012, 11 pages, International Bureau of WIPO, Geneva, Switzerland.
English translation of Japanese Office Action in Japanese Patent Application No. 2012-520902, mailed May 27, 2014, 2 pages.

\* cited by examiner

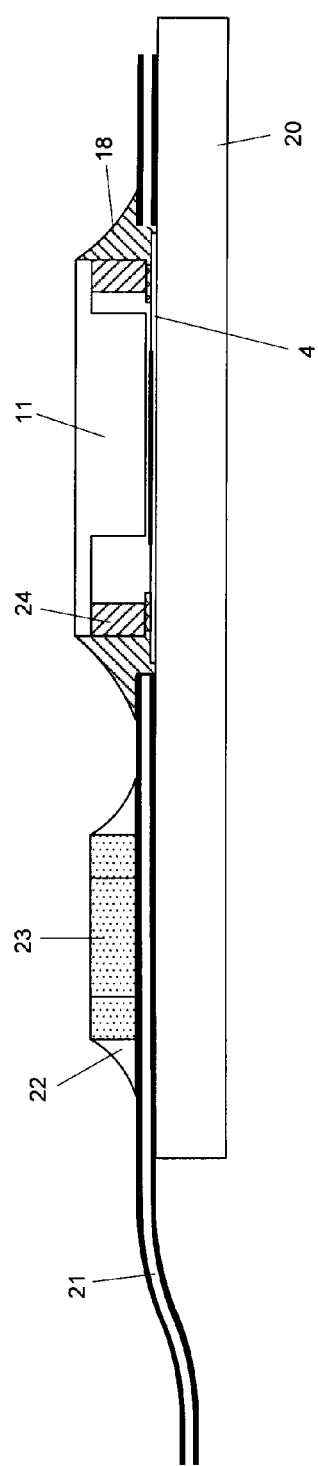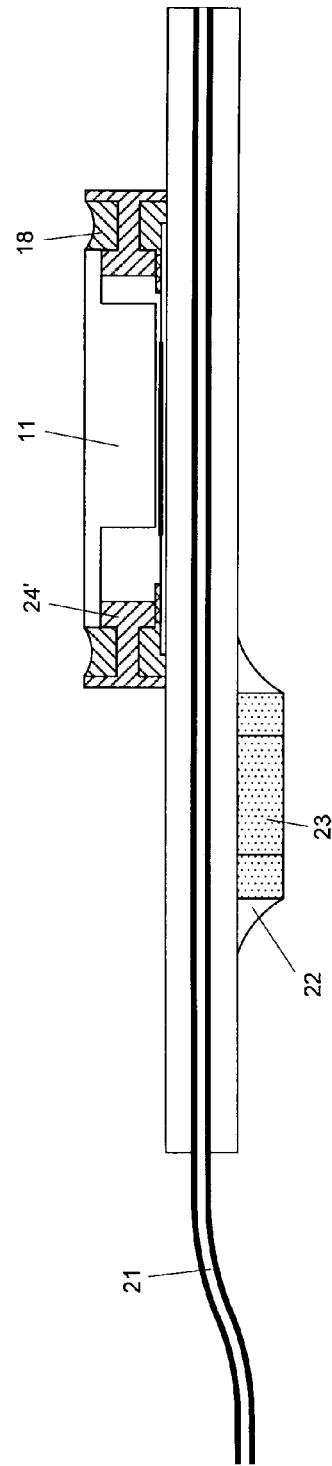
Fig. 5a
Fig. 5b

OPTICAL MODULE FOR SIMULTANEOUSLY FOCUSING ON TWO FIELDS OF VIEW

The invention relates to an optical module which, as a camera system, can be used as a driving environment sensor for driver assistance systems in a vehicle.

Intelligent driver assistance systems often use a camera system as a driving environment sensor, for example for detecting a variety of different objects in the traffic situation.

The camera system is often arranged behind the windshield of the vehicle and sees through the windshield. Examples include vehicle cameras for detecting the lane markings, night-vision cameras or stereo cameras as optical distance sensors. All of these optical sensors require inter alia clear vision through the windshield in order to avoid incorrect measuring signals. The number and quality of functions that are realized by the evaluation of the image data of camera systems has been increased in the past few years. Today, for example, driver assistance systems are used in vehicles that combine intelligent light control, traffic sign recognition for speed limits and lane keeping assistance systems and that share one camera as a driving environment sensor.

DE 102004037871 B4 shows a camera system for an assistance system detecting the exterior space ahead in the direction of travel of a motor vehicle. By positioning an ancillary lens in a partial field of view in front of the objective of the vehicle camera, the far (road scene) and near range (windshield) are imaged onto an image sensor. The near range can be imaged by the partial ancillary lens or a partial near-range optical system, if applicable also by means of an optical beam splitter or a semi-transparent mirror. It is proposed to use an image sensor alternatingly for an exterior space assistance function and a rain functionality.

This camera system is disadvantageous in that additional ancillary lenses and, if applicable, beam splitters or semi-transparent mirrors are expensive and place high demands on their precise orientation relative to the other optical components. The stability of the entire camera system can be compromised as a result. The positioning of the ancillary lens leads to heavy blurring in the camera image.

The object of the invention is to provide an affordable, stable and reliable optical system for a camera sensor. Another object of the invention is at the same time to increase or ensure the reliability of the image data captured by the camera system and to realize or enable further assistance functions with one camera system.

The optical module according to the invention comprises a semiconductor element having a surface that is sensitive to electromagnetic radiation and an objective for projecting electromagnetic radiation onto the sensitive surface of the semiconductor element. That is, the semiconductor element is the image sensor or camera chip, in particular in the form of a CCD or CMOS, and can be arranged on a printed circuit board. The objective preferably comprises at least one lens and one lens retainer.

In the optical module, an optical element having two sub-areas is arranged either in the space between the objective and the sensitive surface of the semiconductor element or between individual lenses of the objective in the entire cross-section of the beam path. All electromagnetic radiation that reaches the sensitive surface of the semiconductor element passes through the optical element.

A first distance range (e.g. near range) is imaged in a first area of the sensitive surface of the semiconductor element in a focused manner by a first sub-area of the optical element, and a second distance range (e.g. far range) is imaged in a second area of the sensitive surface of the semiconductor element by a second sub-area of the optical element.

In other words, an optical device is provided that comprises a semiconductor element having a surface that is sensitive to electromagnetic radiation and an objective for projecting electromagnetic radiation onto the sensitive surface of the semiconductor element, wherein an optical element is arranged either between the objective and the sensitive surface of the semiconductor element or between individual lenses of the objective, wherein the optical element has two sub-areas, the optical properties of which can be adjusted during manufacture so as to be able to image in a sharp manner two independent ranges of focus on the sensitive surface of the semiconductor element after passage through the two sub-areas.

If the optical element is arranged immediately above the image sensor, the optical element covers the entire optical range of an image sensor and enables bifocal or multifocal imaging with one objective and one image sensor.

In a preferred embodiment the optical element of the optical module comprises at least two plane-parallel sub-areas of different thicknesses. The optical element is stepped in this case.

According to an advantageous realization the optical element of the optical module comprises at least two sub-areas with materials having different refractive indices. Instead of a stepped thickness of the module sub-areas, the sub-areas are realized by means of a material variation within the optical element, e.g. a plane-parallel transparent plate.

In both variants at least two different depth-of-field regions are possible in a camera image, said regions also intersecting one another. The optical element has the property of effecting a different axial offset of a non-parallel beam path due to sub-areas of the element having different thicknesses.

The optical element is preferably manufactured as a single piece, but it can also be an element assembled from at least two individual elements, said individual elements defining the sub-areas of the optical element. The optical element is preferably a plane-parallel plate or at least two plane-parallel plates (of different thicknesses) that are connected to one another.

In an alternative embodiment the optical element of the optical module comprises a part of a converging lens in the first sub-area and a plane-parallel plate in the second sub-area. The connecting line of the two sub-areas represents the boundary between far-range and near-range imaging. The near-field imaging beam path is collimated additionally by the first sub-area of the optical element that has a curved surface. The far-field imaging beam path is diverged additionally by the plane-parallel plate in the second sub-area. In this manner, sharp imaging of the near and far range is achieved in the same imaging plane.

The optical element of the optical module is preferably arranged such that a plane surface of the optical element covers the sensitive surface of the semiconductor element. In the case of a stepped optical element the step is, therefore, located in the direction facing away from the semiconductor element. This enables stable fastening of the optical element, e.g. on the semiconductor element or the printed circuit board or carrier. Moreover, the optical element functions as the covering glass, such as may be provided on traditional camera systems.

As an alternative to the above realization, the thinner sub-area can be arranged on the side facing away from the sensitive surface of the semiconductor element in a stepped optical element. Here, a spacer can be provided below the thinner sub-area, said spacer being preferably arranged outside the field of view of the image sensor and enabling stable attachment of the optical element. The optical element can thus be adjusted with its continuous surface relative to the semiconductor element in such a manner that the electromagnetic radiation passes said continuous surface before the geometrical transition in the optical element and the imaging beam path of the system reaches the edge at a position on the optical axis that is more favorable to the imaging quality and the extension in a transition zone than it would be in the reverse case (smaller diameter of the imaging beam path).

In an advantageous realization a spacer is provided below the thinner sub-area of the optical element, said spacer extending in a u-shaped manner below the exterior of the thinner sub-area. The spacer can serve to prevent a sealing compound for sealing the semiconductor element and the optical element from entering the area between the semiconductor element and the thinner sub-area.

In a preferred embodiment of the optical module the optical element is configured such that the thinner sub-area completely extends around the thicker sub-area outside the field of view. The spacer extends around the area between the sensitive surface and the optical element in a frame-like manner.

In an advantageous further development the spacer can be designed as a frame for the sealing compound for sealing the semiconductor element. In this manner, the space available for the sealing compound to spread is limited.

The invention moreover relates to a vehicle with an optical module according to the invention, wherein the optical module is arranged in the interior of a vehicle behind the windshield in the direction of travel in a manner sensing the exterior space.

In a preferred embodiment the objective and the optical element in the vehicle are adjusted such that the exterior of the windshield is imaged in a focused manner on the first area of the sensitive surface of the semiconductor element by the first sub-area of the optical element and the area ahead of the vehicle is imaged on the second area of the sensitive surface of the semiconductor element by the second sub-area of the optical element.

In preferred further development a camera-based rain sensor can be provided in a vehicle. The images of the first area of the sensitive surface of the semiconductor element (exterior of the windshield) are evaluated, wherein rain or particles of dirt present on the windshield are detected in this process. An output signal for activation can be output to a wiper control and/or a window cleaning system. Further advantageous functions are possible on the basis of the camera-based rain sensor: in particular, speed limits are often combined with supplementary signs such as "when wet". While a camera-based traffic sign recognition can recognize this supplementary sign, it does not, at first, have any information as to whether it is raining, and if so, how heavy the rain is. This information can be provided by the rain sensor according to the invention, which, due to the optical element according to the invention, runs on the same camera or the same optical module as the traffic sign recognition. Data exchange between the two assistance functions can also be set up without any difficulty and in an affordable manner.

In a preferred realization an illumination source is provided that illuminates the area of the field of view through the windshield through which near-range imaging occurs, i.e. the area that is imaged in the first area of the sensitive surface of the semiconductor element. The near field is advantageously illuminated with IR light. The illumination source can advantageously be controlled by an optical shutter, in particular with a variable illumination time of the entire sensitive surface of the semiconductor element or in particular for the sub-area of the active surface where imaging of the near field occurs.

The radiation of the illumination source can be coupled into the windshield in particular via a flexible light-guide body. Transparent silicone, for example, is a suitable flexible light-guide body. The partial radiation energy can be converted into heat via an absorber element attached to the windshield, said heat being used for heating the windshield sub-surface. The heating wires of an existing window heating can be used as absorber elements, for example. The heating wires used as an absorber surface can at the same time serve to provide shading of the light emitted in the direction of travel of the motor vehicle.

In a preferred embodiment a filter coating is provided on at least one side of the second sub-area of the optical element, the wavelength filter of which suppresses the wavelength range that is used by the illumination source for illuminating the near range. The area of the field of view through the windshield is in particular illuminated with light in the infrared wavelength range (IR), and the second sub-area of the optical element is coated with a filter that suppresses the transmission in the infrared wavelength range. This wavelength range is not perceived by the driver and other road users. At the same time, the sensitive surface of the semiconductor element has a very high sensitivity to the IR range, which enables the near field to be illuminated with IR light of a relatively low intensity. It is possible to attach the illumination source in various different areas. Illumination can be continuous or cyclical. A cyclical illumination having a sinusoidal shape of intensity or a timed illumination is to be preferred so as to avoid or reduce interferences in the image of the far range.

In an advantageous realization a capacitive rain sensor can be provided in the vehicle in addition to the camera-based rain sensor. The signals from the capacitive and camera-based rain sensors are evaluated by a joint evaluation unit. Both sensor types complement one another very well, and combined they offer excellent detection properties. The capacitive sensor can be advantageously designed as a strip conductor in transparent foil or in a silicone pad and the electronics can be integrated into the illumination module for the camera-based rain sensor.

The camera-based rain sensor is advantageous, for example, in situations of very fine, drizzling rain, while in the capacitive rain sensor there is hardly any signal change by changing capacitance in such situations. The capacitive rain sensor on the other hand is advantageous, for example, if the windshield is covered by a continuous film of water, and it can reliably detect this film due to a significant change in capacitance, while the camera-based rain sensor will find only few edges in the image from which it assumes rain drops to be present.

In an advantageous realization of the invention, a wedge plate can be arranged between the windshield and the objective in the field of view of the near-range imaging. The wedge plate is arranged, hence, on the object side of the beam path of the near-range imaging. The wedge plate deflects electromagnetic radiation from an area of the windshield penetrated by the field of view of the far-range imaging into the field of view of the near-range imaging. The wedge plate can be defined by two plane surfaces or one plane surface and one non-planar surface or by two non-planar surfaces. A non-planar surface means a spherical, aspherical or microstructured surface. The wedge plate can in particular consist of a transparent plastic material. The wedge plate is preferably arranged such that the thick end faces upward and the thin end faces downward. In this manner, the beam path of the near-range imaging is deflected upwardly. The wedge plate can be advantageously arranged below or in the lower region of the beam path of the far-range imaging.

The wedge plate is preferably coated with a filter coating, said filter coating suppressing specific wavelength ranges, e.g. the visible wavelength range. The upper side of the wedge plate can be advantageously colored black in order to suppress stray light.

The advantage of using a wedge plate lies in a smaller required cutout area in the windshield sunshade band and in smaller dimensions of the optical module or camera system.

In a preferred embodiment a vehicle comprises an illumination source, the electromagnetic radiation of which is coupled into the windshield via a coupling element (e.g. a flexible light-guide body). A decoupling element is provided that is in firm contact with the windshield by means of being glued or pressed thereon. If no drops of water are present on the windshield, the electromagnetic radiation coupled into the windshield is totally reflected within the windshield. By means of the decoupling element the radiation is decoupled in the direction of the optical module and imaged onto the image sensor in the area of the near-range imaging (sub-area for rain detection). If drops of water are present on the windshield, part of the electromagnetic radiation coupled into the windshield is decoupled by the water drops and no longer totally reflected to the decoupling element. Thus, the presence of water drops and the amount of rain on the windshield can be determined as a signal difference of the decoupled intensity for a dry compared to a wet windshield.

The decoupling element can preferably be coated with a special filter coating that suppresses specific wavelength ranges, e.g. the visible wavelength range.

On the side facing the objective the decoupling element can advantageously by designed as a mat screen by appropriate surface treatment, the mat screen surface being positioned in the object plane of the near-range imaging.

In an extended embodiment the decoupling element advantageously covers only a defined sub-surface of the sub-area of the windshield field of view that is sensed by the near-range imaging. In this manner, both the differential measurement of the signal decoupled by the rain drops can be performed and the signal proportion scattered by the drops toward the objective can be measured in the other sub-area. The combination of both measurement methods enables a precise measurement of the moisture on the windshield.

The invention also relates to a method of manufacturing a plurality of optical elements according to the invention, said optical elements each having at least two plane-parallel sub-areas of different thicknesses. A first glass wafer or first plate made of optically transparent material having a first thickness is provided with a corresponding plurality of recesses. This means that at least one recess is to be provided for each optical element to be manufactured. The first glass wafer is covered by and connected to a second, continuous glass wafer or second plate made of optically transparent material having a second thickness. The two wafers or plates are aligned on top of one another and e.g. glued to one another.

The individual optical elements having at least two plane-parallel sub-areas of different thicknesses are the result of sawing the combined wafer along sawing edges. This manufacturing method employs standardized methods known from the production of semiconductor or micro-optical elements.

Before sawing the two glass wafers, preferably a third wafer comprising a corresponding plurality of semiconductor elements can be aligned together with the two glass wafers and connected to the adjoining glass wafer. The individual semiconductor elements are advantageously designed such that routing of the signals takes place directly on the back surface of the semiconductor element in a so-called signal layer without any additional substrate and the solder balls are also applied directly to the back surface of the semiconductor element. The connection of the surface sensitive to electromagnetic radiation on the upper side to the routing layer on the lower side is typically achieved via vertical interconnect accesses (vias) provided in the semiconductor element. The advantage of this manufacturing method is that the precise positioning of the recess edge in the optical element is done only once for each wafer. Aligning the edge in the optical element parallel to the lines of the sensitive surface of the semiconductor element is simplified considerably. Having to align the wafers with one another only once for a large number of optical components saves costs in the manufacturing process.

The invention further relates to a method of manufacturing an optical module. The method comprises the following steps. A semiconductor element with a surface sensitive to electromagnetic radiation is electronically and mechanically connected to a carrier, in particular a printed circuit board. An optical element with at least two sub-areas for bifocal imaging on the sensitive surface of the semiconductor element is attached to the semiconductor element or the carrier by means of an adhesive. The connecting area of the carrier, semiconductor element, adhesive and optical element is sealed e.g. by means of a sealing compound. An adhesive is applied to the lower surface of the objective housing of an objective or to the carrier. The objective is placed onto the carrier and the arrangement is then adjusted such that the electromagnetic radiation passes through the objective and the optical element and reaches the sensitive surface of the semiconductor element, where the intended areas are imaged. The adhesive hardens in the adjusted arrangement of objective and carrier.

Figure 2:
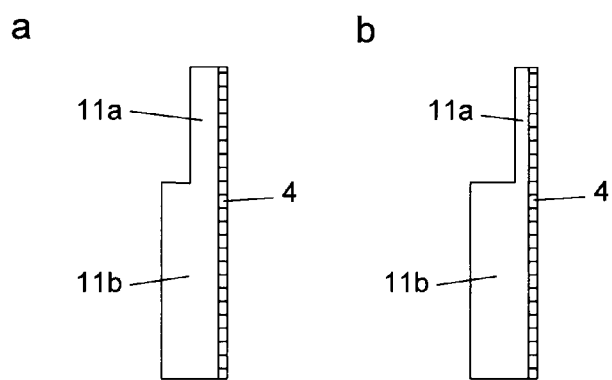
Figure 3:
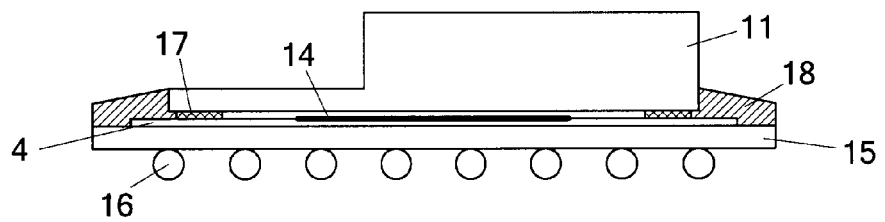

The invention will now be explained with reference to exemplary embodiments and the Figures, in which FIG. 1 shows the imaging properties of an optical module in a motor vehicle with a stepped optical element between the objective and the sensitive surface of the semiconductor element FIGS. 2a and 2b show an optical element with sub-areas of different thicknesses, the continuous surface of the optical element being oriented toward the sensitive surface of the semiconductor element FIG. 3 shows the arrangement of a stepped optical element on top of a semiconductor element on a substrate FIGS. 4a and b show the arrangement of a stepped optical element on top of a semiconductor element on a substrate, the continuous surface of the optical element being oriented toward the side facing away from the semiconductor element (cross-sectional and top view)

Figure 6A:
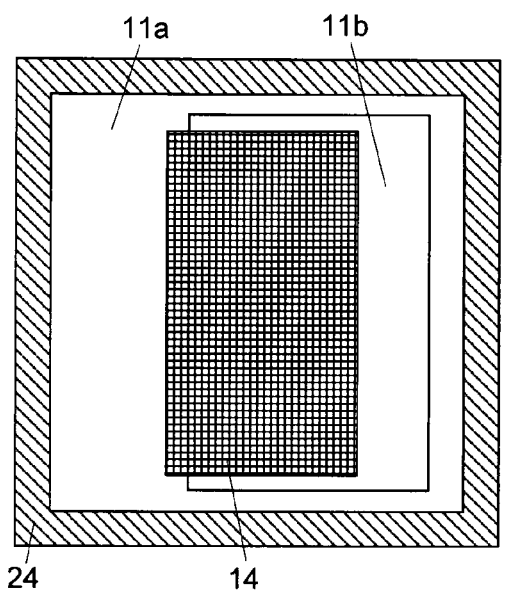
Figure 7:
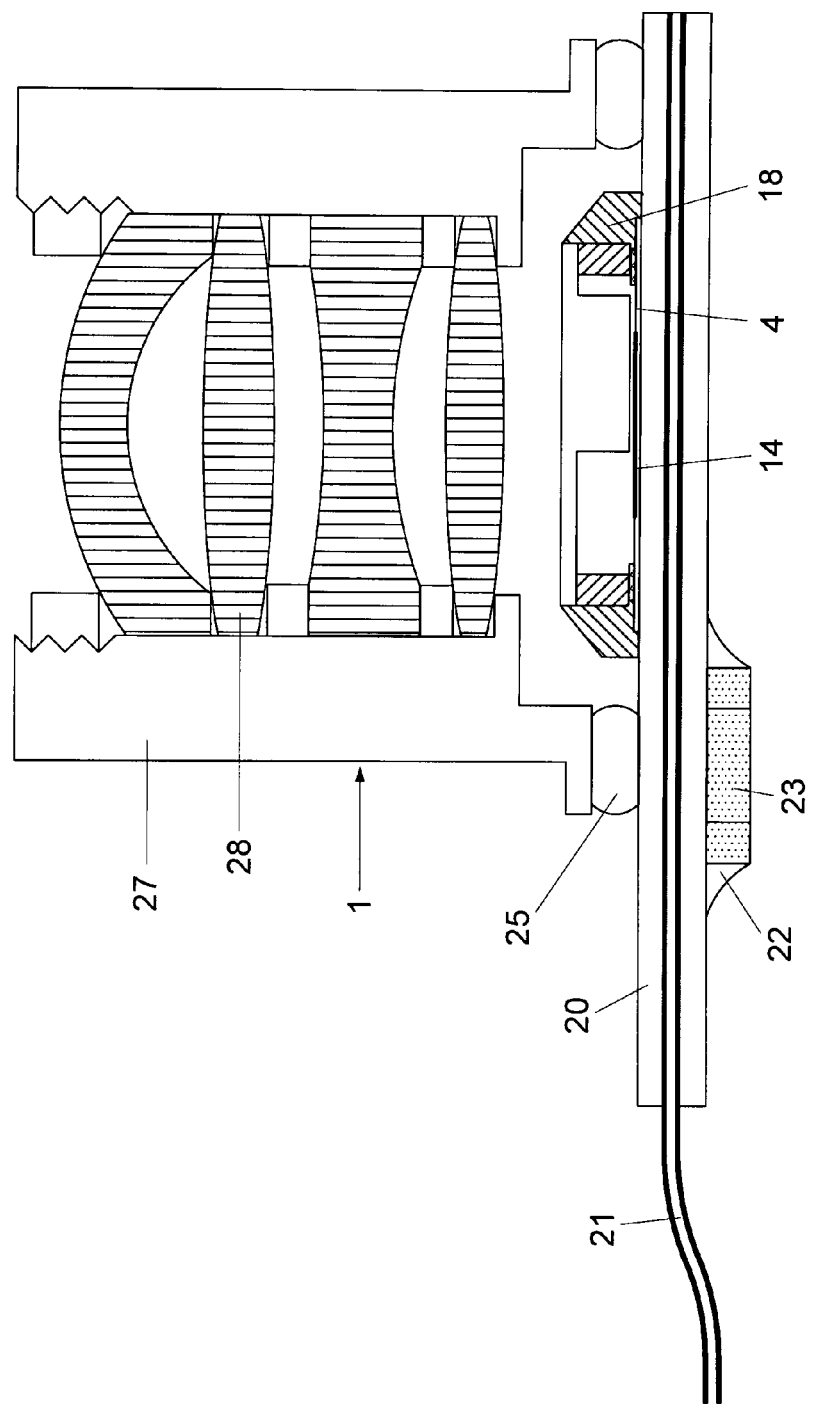
Figure 9:
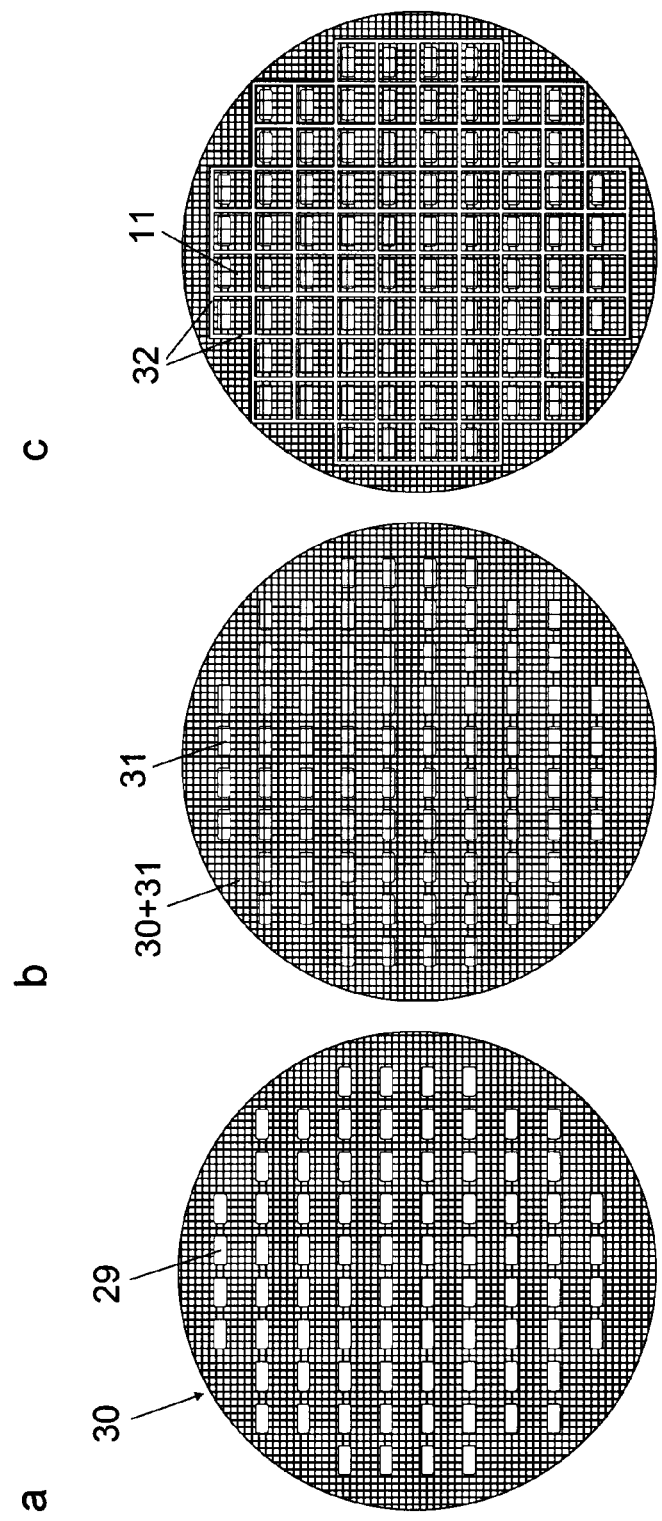
Figure 10:
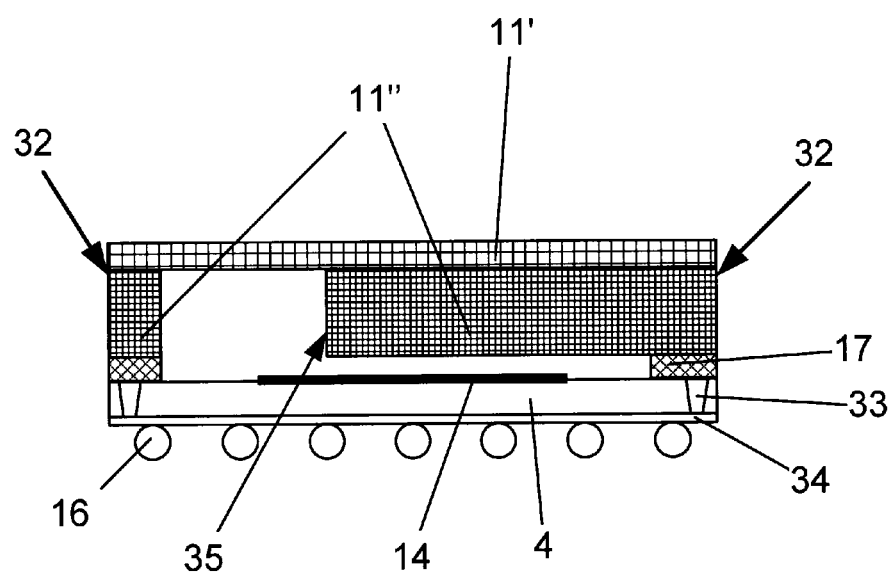

FIGS. 5a and b show the configuration of image sensor components with a stepped optical element on a carrier FIGS. 6a and b show a top view of frame-shaped spacers for the optical element FIG. 7 shows the configuration of an optical module with an objective and an image sensor component FIGS. 8a and b show an optical module with an optical element composed of two layers/sub-elements FIGS. 9a to 9c show a schematic representation of a manufacturing method for an optical element according to the invention FIG. 10 shows an optical component with a semiconductor element manufactured from a wafer In FIG. 1 the imaging properties of an optical module having an objective (1), an optical element (11) with two sub-areas and a semiconductor element (4) for detecting electromagnetic radiation are shown schematically. The optical module shown is arranged below an inclined pane (5), e.g. the windshield of a vehicle.

The dashed lines (10) include the field of view of the optical module, said field of view being delimited toward the bottom by a stray light shade.

The optical element (11) shown has a thinner first sub-area (top) and a thicker second sub area (bottom). Each sub-area corresponds to a plane-parallel plate.

The principle of this bifocal optical system is based on the axial offset of a non-parallel beam path of a refractive planar surface. The objective (1) is focused such that the far range (8) is imaged on the sensitive surface of the semiconductor element (4) in a sharp manner only through the thicker sub-area of the optical element (11) and the near range (9) through the thinner sub-area. The main plane (2) of the objective (1) is defined correspondingly. The near range (9) is focused to the exterior of the windshield (5) such that any rain drops (6) or particles of dirt present there can be detected in the corresponding part of the camera image. The far-range imaging (8) is evaluated for camera-based assistance functions, e.g. lane recognition, traffic sign recognition, automatic light control, etc.

The optical element (11) of the optical module is located either between the imaging optical system (1) (i.e. the objective) and the image sensor (4), as shown, and can cover the sensitive surface of the image sensor completely, or, in the case of an optical system with intermediate imaging, it is located in the imaging plane of the intermediate imaging, e.g. between two lenses of the objective (1) (not shown).

In FIGS. 2a and b the optical element (11) is designed in a stepped manner, the continuous surface being oriented toward the image sensor or semiconductor element (4).

The optical element (11) has a first sub-area (11a) that is passed by the beam path for near-range imaging and a second sub-area (11b) that is passed by the beam path for far-range imaging.

In FIGS. 2a and b the thicker sub-area (11b) has a constant thickness in both cases, while the thickness of the thinner sub-area (11a) has been varied during manufacture.

A constant thickness of the thicker area (11b) effects an unchanging object distance of the far range. Due to the variation in thickness of the thinner area (11a) this focusing can be adjusted in the near range.

Focusing is effected by a change in the axial offset in the non-parallel beam path. The adjustment of focusing to the near range can be used to cover different installation situations and thus different objective distances in the near range such as can occur, for example, with different types of vehicle.

If the thinner sub-area (11a) of the optical element (11) is designed thicker, the axial offset increases and thus the depth-of-field region of the near-range imaging shifts away from the objective on the object side, i.e. the object distance becomes larger (cf. FIG. 2a). If the thinner sub-area (11a) is designed thinner as shown in FIG. 2b, the axial offset decreases and thus the depth-of-field region of the near-range imaging shifts toward the objective on the object side, i.e. the object distance becomes smaller.

Thus, if the optical device is adjusted to a changed object distance, only the thinner sub-area (11a) of the optical element (11) is modified that is passed by the beam path of the near-range imaging.

The decisive advantage of this is that the far-range imaging, which in a preferred realization of the invention is also used for safety-relevant driver assistance functions, remains uninfluenced due to the unchanging optical components in the thicker sub-area (11b).

An adjustment to different installation situations with the optical element (11) can also occur by varying the thickness of an adhesive applied on the entire surface between the optical element (11) and the image sensor (4) or an additional covering glass of the image sensor (4), because the adhesive also effects an axial offset in a non-parallel beam path.

With the embodiment variants of the optical module shown in FIGS. 2a and b it is, moreover, possible to shield the sensitive surface of the semiconductor element (4) from environmental impacts by means of the optical element (11).

As an alternative to the stepped optical element (11) shown, an optical element can be used that comprises two sub-areas with different materials (single-piece element or element assembled from two pieces), said optical element extending over the entire image sensor. Materials having different refractive indices are particularly suitable for this purpose. The refractive index and thus near-range focusing can be varied by means of selecting suitable materials for the sub-areas (11a, 11b).

If a higher refractive index is used in the first sub-area (11a), the axial offset increases and the depth-of-field region of the near-range imaging thus shifts away from the objective (1). This means that the object distance becomes larger. If, on the other hand, a lower refractive index is used in the first sub-area (11a), the axial offset decreases and the depth-of-field region of the near-range imaging thus shifts toward the objective (1). The object distance becomes smaller.

A combination of the variation of the thickness and the refractive indices in the sub-areas (11a, 11b) of the optical element (11) can also be realized.

In FIG. 3 shielding of the sensitive surface (14) of the semiconductor element (4) from environmental impacts is shown for the optical module. The optical element (11) is oriented in accordance with FIGS. 2a and b and attached to the semiconductor element (4) outside the sensitive surface (14) by means of an adhesive (17). The semiconductor element (4) is arranged on a substrate (15) below which solder balls (16) are arranged. The substrate (15) is, for example, a printed circuit board that serves to route and allocate the finely structured electrical connections of the semiconductor element (4) to the solder balls (16) on the bottom surface of the substrate (15). The semiconductor element (4) is typically glued onto the substrate (15) and connected to the electronic structures on the substrate (15) via bond connections.

A seal (18), e.g. by means of a sealing compound, covers the connection area of the substrate (15), semiconductor element (4), adhesive (17) and optical element (11). Light reflexes on the surfaces can thus be suppressed. The sensitive surface of the semiconductor element (4) is protected from environmental impacts.

Figure 4A:
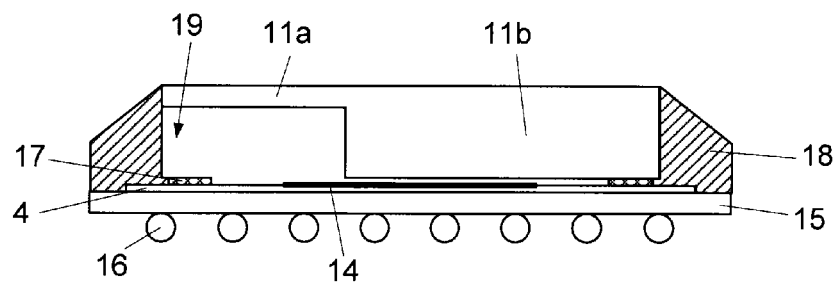

In an alternative embodiment of the optical module according to FIG. 4a, the optical element (11) can be arranged such that the thinner sub-area (11a) is located on the side facing away from the sensitive surface (14) of the semiconductor element (4). The upper exterior of the image sensor unit (4; 14; 11) is thus a continuous transparent planar plate. A seal (18) at the periphery of the optical element (11) can also be applied in this configuration of the optical module to protect the sensitive surface (14) of the semiconductor element (4) from environmental impacts and stray light. At the periphery of the optical element (11) a gap (19) is located below the thinner sub-area (11a). As this area is not imaged on the sensitive surface (14), a spacer (24) is added here for stabilization, said spacer also preventing the penetration of the sealing compound (18). As an alternative, a sufficiently viscous sealing compound (18) could be used that does not flow onto the sensitive surface (14) of the semiconductor element (4), and the spacer could be omitted.

This orientation or arrangement of the optical element (11) is advantageous over the orientation or arrangement shown in FIGS. 1-3 in that the edge between the two sub-areas (11a, 11b) is close to the sensitive surface (14) of the semiconductor element (4). This creates a considerable improvement of the optical properties of the module. A further advantage is that the external stepless surface of the optical element (11) is much easier to clean.

Figure 4B:
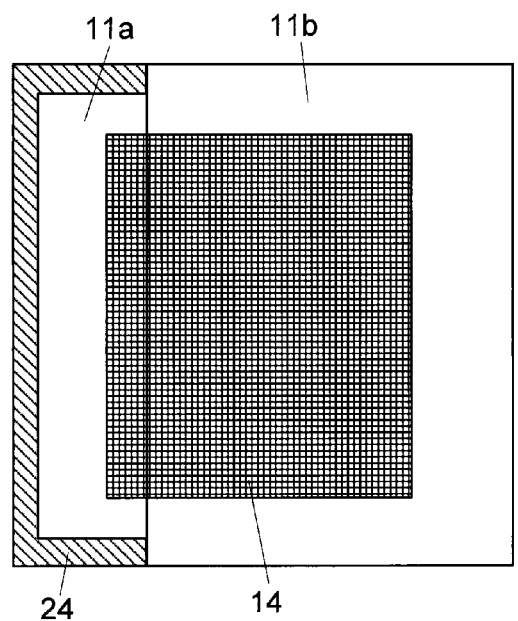

The top view in FIG. 4b shows a u-shaped spacer (24) that extends below the thinner sub-area (11a) along the periphery of the optical element (11) outside the sensitive surface (14) of the semiconductor element. The peripheral area of the optical element (11) does not extend over the sensitive surface (14) of the semiconductor element.

FIG. 5a shows a configuration of an image sensor component with a stepped optical element (11) on a carrier (20). This extension of the substrate (15) to form a carrier (20), for example for further electronic components or the objective, is quite suitable. The stepped optical element (11) is varied compared to the one shown in FIGS. 4a and b in that the thicker sub-area (11b) is surrounded by the thinner sub-area (11a) completely. As the peripheral area of the optical element (11) does not extend over the sensitive surface (14) of the semiconductor element (4), this variation does not influence the optical properties of the optical element (11). A frame-shaped spacer (24, 24') can now be used below the circumferential thinner sub-area (11a) in order to retain or support the optical element (11). A top view of the optical element (11), the frame-shaped spacer (24) and the sensitive surface (14) of the semiconductor element (4) is shown in FIG. 6a.

The spacer (24, 24') used can be designed in different ways and added at different times during the manufacture of the optical module. The spacer (24, 24') can be part of the optical element (11) or it can be present as a separate component. The spacer (24, 24') can rest on the substrate (15) or on the semiconductor element (4). Moreover, the spacer (24, 24') can be designed such that it protrudes from the semiconductor element (4) and can be used for connection to the objective (1).

A seal (18) of the optical element (11), spacer (24, 24') and semiconductor element (4) is provided. The carrier (20) is provided with a flexible connecting contact (21). This ensures spatial orientation of the optical module. Suitable connecting contacts (15) are e.g. bond connections or flexible cables or printed circuit boards, e.g. made of polyimide. Flexible printed circuit boards (e.g. Flex PCB) can at the same time serve as the substrate (15).

Other electronic components (SMD components) (23) such as a chip for image processing can be attached on the surface of the carrier (20), for example by means of a soldered connection (22).

Figure 6B:
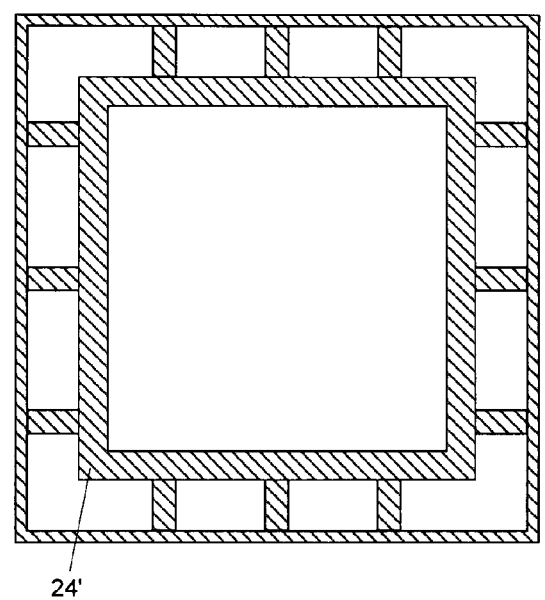

FIG. 5b shows an alternative configuration of an image sensor component. Here, the carrier (20) is equipped with an SMD component (23) on the bottom surface, i.e. it is equipped on both sides. The spacer (24') fulfills a special function in this embodiment: it also serves as a frame for the sealing compound used for the seal (18) of the semiconductor element (4), the optical element (11) and the carrier (20) and restricts the area that can be penetrated by the sealing compound (18) also toward the exterior. FIG. 6b shows a top view of this frame-shaped spacer (24').

FIG. 7 shows the configuration of an optical module with an objective (1) and an image sensor component. Starting from a carrier module (FIG. 5a or b), an objective (1) having at least one lens (28) can be glued onto the carrier (20) with the lower surface of the objective housing (27) such that the electromagnetic radiation passes through the objective (1) and the optical element (11) and reaches the sensitive surface (14) of the semiconductor element (4). After applying the adhesive (25) the objective (1) can be adjusted relative to the sensitive surface (14) of the semiconductor element (4). Once the adhesive (25) has hardened, the optical module can be inserted or installed.

FIG. 8a shows an optical module similar to the one shown in FIGS. 4a and 5a, respectively. In FIG. 8a the stepped optical element (11) is designed of two sub-elements (11', 11") attached on top of one another. The first sub-element (11') is continuous, e.g. a continuous glass plate, and has a first thickness that defines the thickness of the thinner sub-area (11a) of the optical element (11). The second sub-element (11") has at least one recess (29). The first and the second sub-element (11', 11") are connected, e.g. glued, to one another. The thickness of the thicker sub-area (11b) of the optical element (11) corresponds to the total thickness of the two connected sub-elements (11', 11"). FIG. 8b shows a schematic top view: the recess (29) is surrounded completely by the second sub-element (11") such that said second sub-element moreover functions as the spacer (24).

FIG. 9 shows a schematic representation of a manufacturing method for an optical element according to the invention. A first glass wafer (30) of a first thickness is provided with a corresponding plurality of recesses (29) (FIG. 9a). The first glass wafer (30) is covered with and connected to a second, continuous glass wafer (31) of a second thickness (FIG. 9b).

Figure 8:
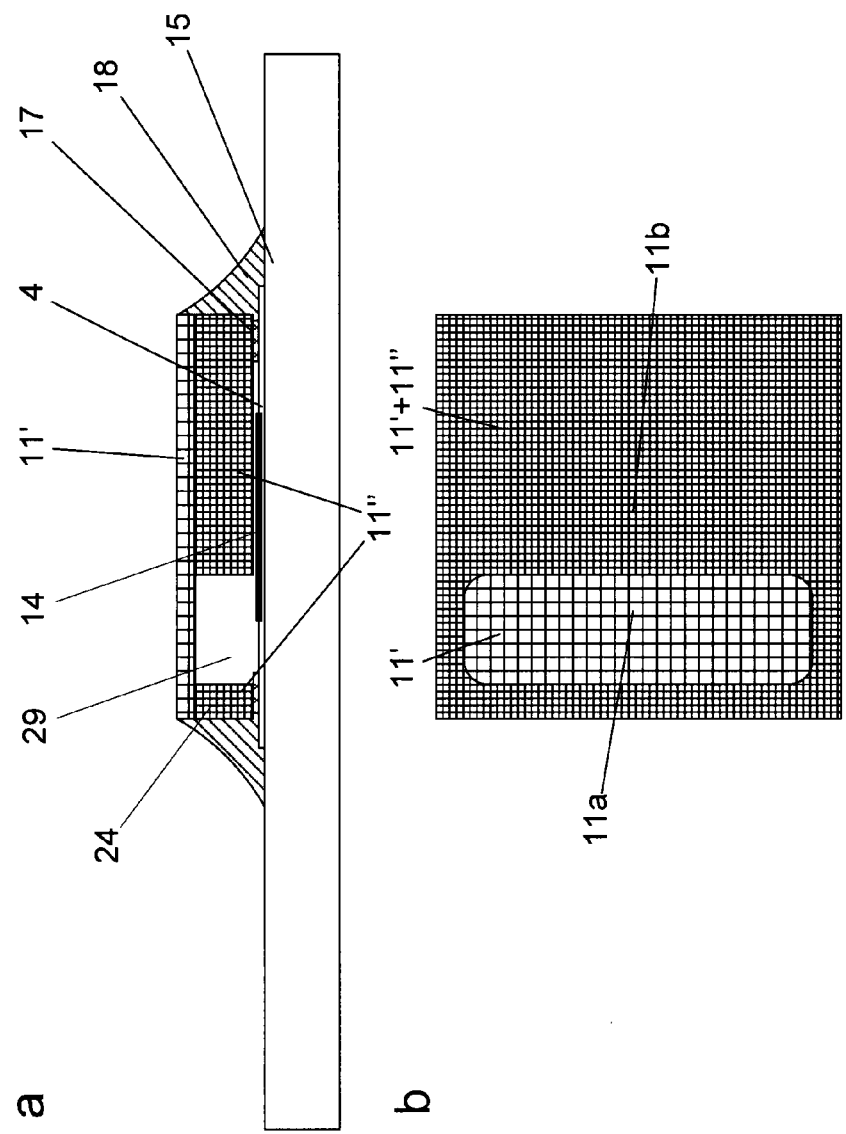

By sawing the combined wafer of FIG. 9b along sawing edges (32), the individual optical elements (11) are produced, as shown in FIG. 9c, with at least two plane-parallel sub-areas (11a, 11b) of different thicknesses as shown in FIG. 8 by way of example. This manufacturing method employs standardized methods known from the production of integrated circuits (ICs) and wafer-level cameras or micro-optical elements.

FIG. 10 shows a component that has been manufactured from three wafers: prior to sawing the two glass wafers (30; 31), a third wafer, comprising a corresponding plurality of semiconductor elements (4), is aligned together with the two glass wafers (30; 31) and connected to the adjoining first glass wafer (30); in FIG. 10 the connection was achieved using an adhesive (17). The individual semiconductor elements (4) having a sensitive surface (14) are designed such that routing of the signals takes place directly on the back surface of the semiconductor element (4) in a so-called signal layer (34) without any additional substrate. The solder balls (16) are applied directly to the back surface of the semiconductor (4) element. The surface (14) sensitive to electromagnetic radiation on the upper surface is connected to the signal layer (34) on the lower surface via vertical interconnect accesses (vias) (33) provided in the semiconductor element (4). Aligning the edge (35) in the optical element (11) parallel to the lines of the sensitive surface (14) of the semiconductor element (4) is simplified considerably by this manufacturing method. The common sawing edge (32) along which the three connected wafers were sawn defines the dimensions of the optical component shown.

REFERENCE NUMERALS 1 objective
2 main plane of the objective
3 semiconductor element 4 windshield
5 rain drops
6 stray light shade
7 far range
8 near range
9 field of view
10 optical element having two sub-areas
11a, 11b first and second sub-area of 11
11', 11" continuous and interrupted part of 11
14 sensitive surface of the semiconductor element
15 substrate
16 solder ball
17 adhesive
18 seal/sealing compound
19 gap
20 carrier
21 flexible connecting contact
22 soldered connection
23 SMD component
24, 24' spacer
25 adhesive
27 objective housing
28 lens
29 recess
30 first glass wafer with recesses
31 second continuous glass wafer
32 sawing edge
33 vertical interconnect access (via)
34 signal layer
35 edge of the optical element 11

The invention claimed is:

1. An optical module, comprising
a semiconductor element (4) having a sensitive surface (14) that is sensitive to electromagnetic radiation and
an objective (1) for projecting electromagnetic radiation onto the sensitive surface (14) of the semiconductor element (4),
characterized in that an optical element (11) having at least two plane-parallel sub-areas (11a, 11b) of different thicknesses is arranged either in the space between the objective (1) and the sensitive surface (14) of the semiconductor element (4) or between individual lenses of the objective in the entire cross-section of the beam path, such that a first distance range (8) is imaged in a first area of the sensitive surface (14) of the semiconductor element (4) by a first sub-area (11a) of the optical element (11), and a second distance range (9) is imaged in a second area of the sensitive surface (14) of the semiconductor element (4) by a second sub-area (11b) of the optical element (11).

2. The optical module according to claim 1, characterized in that the optical element (11) has a stepped configuration and is arranged such that a continuous surface of the optical element (11) is oriented toward the sensitive surface (14) of the semiconductor element (4).

3. The optical module according to claim 1, characterized in that the optical element (11) has a stepped configuration and is arranged such that a stepped edge between the two sub-areas (11a, 11b) is close to the sensitive surface (14) of the semiconductor element (4) and a continuous surface of the optical element (11) is an external surface.

4. The optical module according to claim 3, further comprising a spacer (24) that extends in a U-shape below an exterior of a thinner one of the two sub-areas (11a).

5. The optical module according to claim 3, characterized in that a thinner one of the two sub-areas (11a) completely extends around a thicker one of the two sub-areas (11b) of the optical element (11), and further comprising a spacer (24, 24') that extends around an area between the sensitive surface and the optical element (11) in a frame-like manner.

6. The optical module according to claim 5, characterized in that the spacer (24') is configured as a frame, and further comprising a sealing compound that is surrounded by the frame for sealing the semiconductor element (4) to protect the sensitive surface (14) of the semiconductor element (4) from environmental impacts and stray light.

7. The optical module according to claim 1, characterized in that the optical module is arranged in the interior of a vehicle behind a windshield (5) of the vehicle with respect to a direction of travel, such that the optical module receives electromagnetic radiation from an exterior space outside of the vehicle.

8. The optical module according to claim 7, characterized in that the objective (1) and the optical element (11) are adjusted such that an exterior surface of the windshield (5) facing the exterior space is imaged in a focused manner on the first area of the sensitive surface (14) of the semiconductor element (4) by the first sub-area (11a) of the optical element (11) and an area of the exterior space ahead of the vehicle is imaged on the second area of the sensitive surface (14) of the semiconductor element (4) by the second sub-area (11b) of the optical element (11).

9. The optical module according to claim 8, characterized in that rain drops (6) and/or particles of dirt present on the exterior surface of the windshield (5) can be detected in the first area of the sensitive surface (14) of the semiconductor element (4), and an output signal of the optical module can be output to a wiper control and/or a window cleaning control of the vehicle.

10. The optical module according to claim 9, characterized in that a capacitive rain sensor is provided in the vehicle in addition to a camera-based rain sensor formed with the optical module, and a joint evaluation unit evaluates signals from the capacitive rain sensor and the camera-based rain sensor.

11. The optical module according to claim 8, further comprising an illumination source that provides electromagnetic radiation to illuminate an area (9) of a field of view (10) through the windshield (5) that is imaged in the first area of the sensitive surface (14) of the semiconductor element (4).

12. The optical module according to claim 11, further comprising a flexible light-guide body that couples the electromagnetic radiation of the illumination source into the windshield (5).

13. The optical module according to claim 11, characterized in that the electromagnetic radiation that illuminates the area (9) of the field of view (10) through the windshield (5) comprises light in an infrared wavelength range, and the second sub-area (11b) of the optical element (11) is coated with a filter that suppresses transmission in the infrared wavelength range.

14. The optical module according to claim 8, further comprising a wedge plate arranged between the windshield (5) and the objective (1) in a field of view of the imaging of the exterior surface of the windshield (5).

15. The optical module according to claim 8, further comprising an illumination source that provides electromagnetic radiation which is coupled into the windshield, and a decoupling element arranged in firm contact with the windshield (5), which decoupling element decouples the electromagnetic radiation coupled into the windshield such that said electromagnetic radiation is imaged in the first area of the sensitive surface (14) of the semiconductor element (4).

16. The optical module according to claim 15, characterized in that the decoupling element covers the sub-area of the field of view of the windshield (5) that is sensed by the near-range imaging (9).

17. A method of manufacturing the optical module according to claim 1, comprising the steps:
- connecting to a carrier (20), a semiconductor element (4) having a surface (14) that is sensitive to electromagnetic radiation,
- attaching on the semiconductor element (4), by a first adhesive (17), an optical element (11) having at least two sub-areas (11a, 11b) for bifocal imaging,
- sealing, by a sealing compound (18), a connection area of the carrier (20), the semiconductor element (4), the adhesive (17) and the optical element (11),
- applying a second adhesive (25) to a lower surface of an objective housing (27) of an objective (1) or to the carrier (20),
- placing the objective (1) onto the carrier (20) and adjusting the arrangement such that electromagnetic radiation passes through the objective (1) and the optical element (11) and reaches the sensitive surface (14) of the semiconductor element (4), and
- hardening the second adhesive (25) in the adjusted arrangement of the objective (1) and the carrier (20).

18. A method of manufacturing a specific number of similar optical elements (11) each having at least two sub-areas (11a, 11b), wherein
- a first glass wafer (30) of a first thickness is provided with a corresponding number of recesses (29),
- said first glass wafer (30) is covered with and connected to a second glass wafer (31) of a second thickness, and
- the specific number of individual optical elements (11) having at least two plane-parallel sub-areas (11a, 11b) of different thicknesses results from sawing (32) the combined wafer.

* * * * *